United States Patent
Jang

(10) Patent No.: US 6,609,991 B2
(45) Date of Patent: Aug. 26, 2003

(54) HYDRAULIC CONTROL SYSTEM FOR AUTOMATIC TRANSMISSION

(75) Inventor: Jae-Duk Jang, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/224,478

(22) Filed: Aug. 21, 2002

(65) Prior Publication Data

US 2002/0193199 A1 Dec. 19, 2002

Related U.S. Application Data

(62) Division of application No. 09/667,592, filed on Sep. 22, 2000.

(30) Foreign Application Priority Data

Dec. 28, 1999 (KR) .............................................. 99-63713

(51) Int. Cl.[7] .......................... F16H 61/12; F16H 61/60
(52) U.S. Cl. ..................... 475/119; 475/120; 475/122; 475/127
(58) Field of Search ........................... 475/59, 118, 119, 475/120, 121, 122, 127, 284, 287, 286, 297, 281

(56) References Cited

U.S. PATENT DOCUMENTS

| | | | | |
|---|---|---|---|---|
| 4,938,096 A | * | 7/1990 | Takahashi et al. ...... | 475/287 X |
| 4,944,719 A | * | 7/1990 | Takahashi et al. ...... | 475/287 X |
| 4,994,006 A | * | 2/1991 | Kinoshita et al. ............ | 475/286 |
| 5,069,656 A | * | 12/1991 | Sherman .................. | 475/284 X |
| 5,129,871 A | * | 7/1992 | Sandel et al. ................ | 475/297 |
| 5,167,593 A | * | 12/1992 | Pierce ......................... | 475/281 |
| 5,707,312 A | * | 1/1998 | Sefcik ......................... | 475/284 |
| 5,720,694 A | * | 2/1998 | Jang ....................... | 475/121 X |
| 5,772,552 A | * | 6/1998 | Ibaraki et al. ............... | 475/281 |
| 5,967,936 A | * | 10/1999 | Kim et al. ................... | 475/287 |
| 6,139,459 A | * | 10/2000 | Suzuki ........................ | 475/127 |
| 6,319,165 B1 | * | 11/2001 | Itou et al. .................... | 475/119 |

FOREIGN PATENT DOCUMENTS

JP 362258250 * 11/1987 .................. 475/119

* cited by examiner

Primary Examiner—Charles A Marmor
Assistant Examiner—Ha Hu
(74) Attorney, Agent, or Firm—Birch, Stewart, Kolasch & Birch, LLP

(57) ABSTRACT

A hydraulic control system in which hydraulic pressure generated pressure generated by an oil pump is supplied to a pressure/damper clutch controller, a pressure reducer, and a shift controller, wherein the pressure reduced by the pressure reducer and the hydraulic pressure supplied as a result of port conversion of the sift controller are supplied to the hydraulic pressure controller, and hydraulic pressure controlled by the hydraulic pressure controller is supplied to a hydraulic pressure distributor and directly to some friction elements.

1 Claim, 13 Drawing Sheets

FIG.2

Operational Chart

| Shift Range | | C1 | C2 | C3 | C4 | B1 | B2 | F1 | F2 | Engine Brake |
|---|---|---|---|---|---|---|---|---|---|---|
| P | | | | | | | | | | |
| R | | | | ● | | ● | | | | Engaged |
| N | | | | | | | | | | |
| D | 1 | ● | | | ◎ | | | | ▲ | |
| | 2 | ● | | | ◎ | | ● | ▲ | ▲ | Engaged |
| | 3 | ● | ● | | | | ● | ▲ | ▲ | Engaged |
| | 4 | ● | ● | | | | | | | |
| 2 | 1 | ● | | | ◎ | | | | △ | |
| | 2 | ● | | | ◎ | | ● | ▲ | △ | Engaged |
| L | 1 | ● | | | ◎ | ◎ | | △ | △ | Engaged |

HYDRAULIC CONTROL SYSTEM FOR AUTOMATIC TRANSMISSION

This application is a divisional of co-pending application Ser. No. 09/667,592, filed on Sep. 22, 2000, the entire contents of which are hereby incorporated by reference and for which priority is claimed under 35 U.S.C. § 120; and this application claims priority of Application No. 99-63713 filed in Korea on Dec. 28, 1999 under 35 U.S.C. § 119.

BACKGROUND OF THE INVENTION

1. Field of the Invention

The present invention relates to a hydraulic control system for an automatic transmission, and more particularly, to a hydraulic control system applied to a powertrain utilizing two single pinion planetary gearsets, four clutches, two one-way clutches, and two brakes to obtain four forward speeds and one reverse speed.

2. Description of the Related Art

Conventional automatic transmissions used in vehicles include a torque converter, a multi-stage gear shift mechanism connected to the torque converter, and a plurality of friction elements actuated by hydraulic pressure for selecting one of the gear stages of the gear shift mechanism, the gear shift mechanism being realized through a planetary gearset. The friction elements are controlled to engaged and disengaged states by a hydraulic control system, which controls pressure generated by an oil pump, to change shift ratios of the planetary gearset.

The friction elements are selectively operated by a plurality of valves, which undergo port conversion to change the flow of hydraulic pressure, and actuators supplying hydraulic pressure to the valves. Further, a manual valve, indexed with a driver-operated shift selector to realize port conversion, is connected to a plurality of lines to supply hydraulic pressure from the oil pump to each valve and actuator.

Solenoid valves are operated to ON and OFF states in different combinations to realize control into the various speeds and shift modes. That is, as described above, the solenoid valves are operated to ON and OFF states such that the supply of hydraulic pressure to the valves is controlled. This, in turn, controls the supply of hydraulic pressure to specific friction elements to control the same, thereby ultimately controlling the multi-stage gear shift mechanism for control into the different shift speeds and modes.

However, in the prior art hydraulic control system, an engine brake is applied frequently at unsuitable times such that drive performance is reduced. Also, fail-safe means in case the transmission malfunctions is not provided.

SUMMARY OF THE INVENTION

The present invention has been made in an effort to solve the above problems.

It is an object of the present invention to provide a hydraulic control system applied to a powertrain utilizing two single pinion planetary gearsets, four clutches, two one-way clutches, and two brakes to obtain four forward speeds and one reverse speed, the hydraulic control system operating an engine brake at only a high stage of each range such that drive performance is improved and which provides a fail-safe mode by holding a fourth speed in a drive D range and a third speed in a low D2 range such that drive performance is improved.

To achieve the above object, the present invention provides a hydraulic control system in which hydraulic pressure generated by the operation of an oil pump is supplied to pressure/damper clutch control means, pressure reducing means, and shift control means, pressure reduced by the pressure reducing means and hydraulic pressure supplied as a result of port conversion of the shift control means being supplied to hydraulic pressure control means, and hydraulic pressure controlled by the hydraulic pressure control means being supplied to hydraulic pressure distribution means and directly to selective friction elements to engage the same.

The shift control means includes a manual valve which is indexed with a driver-controlled select lever to supply hydraulic pressure through five different lines to the hydraulic pressure control means, the hydraulic pressure distribution means, and the friction elements, the hydraulic pressure control means includes first, second and third pressure control valves which are controlled by pressure controlled by first, second and third solenoid valves, the first pressure control valve controlling hydraulic pressure to be directly supplied to a first clutch operating in forward shift modes, the second pressure control valve controlling hydraulic pressure to be supplied to a second brake operating in second and fourth speeds of a drive D range, and the third pressure control valve controlling hydraulic pressure to be supplied to a first brake operating in a low L range and a reverse R range and to a third clutch operating in third and fourth speeds of the drive D range such that hydraulic pressure is supplied to two valves of the hydraulic pressure distribution means.

The hydraulic pressure distribution means comprises a low control valve for supplying L-range pressure to another valve as control pressure in the low L range such that control pressure of the third pressure control valve is supplied to the first brake; an N-R control valve for supplying reverse pressure to the first brake by reduced pressure supplied via the pressure control valve when shifting into the reverse R range; a line pressure control switch valve controlled by D-range pressure and hydraulic pressure supplied to a second clutch, the line pressure control switch valve supplying a part of the hydraulic pressure supplied to the second clutch to a pressure regulator valve; a first fail-safe valve controlled by control pressure supplied from the low control valve and from the second pressure control valve, the first fail-safe valve undergoing port conversion to supply hydraulic pressure supplied from the third pressure control valve to the second clutch in the third and fourth speeds of the drive D range, and hydraulic pressure supplied from the third pressure control valve to the first brake in the low L range; a second fail-safe valve controlled by reverse pressure, hydraulic pressure supplied to a fourth clutch, and hydraulic pressure supplied to the third clutch, the second fail-safe valve supplying hydraulic pressure supplied from the second pressure control valve to the second brake in the second and fourth speeds of the drive D range; and an engine brake control switch valve for supplying D-range pressure to the fourth clutch in the first and third speeds of the drive D range.

According to a feature of the present invention, the manual valve is connected to a reverse R range pressure line directly communicated with the third clutch; a forward pressure line connected to the pressure regulator valve; a drive D range pressure line connected to the first, second and third pressure control valves, the second fail-safe valve, and the engine brake control switch valve; a low D2 range pressure line connected to the fourth clutch with a 3-way valve interposed therebetween; and a low L range pressure line connected to the low control valve.

According to another feature of the present invention, the first, second and third solenoid valves are 3-way valves which maintain a closed state when controlled to OFF.

According to yet another feature of the present invention, a valve body of the first pressure control valve includes a first port for receiving hydraulic pressure reduced by a reducing valve; a second port for receiving hydraulic pressure from the manual valve; a third port for supplying the hydraulic pressure received by the second port to the first clutch; and a fourth port for receiving control pressure from the first solenoid valve; a valve spool of the first pressure control valve slidably provided in the valve body of the first pressure control valve includes a first land on which the hydraulic pressure supplied through the first port acts, the first land having a relatively small diameter; a second land on which the hydraulic pressure supplied through the first port acts to selectively open and close the second port; and a third land which, together with the second land, selectively communicates the second port and the third port; and an elastic member is disposed between the third land and the valve body.

According to still yet another feature of the present invention, a valve body of the second pressure control valve includes a first port for receiving hydraulic pressure reduced by a reducing valve; a second port for receiving hydraulic pressure from the manual valve; a third port for supplying the hydraulic pressure supplied to the second port to the first fail-safe valve and the engine brake control switch valve; a fourth port for receiving control pressure from the second solenoid valve; and a fifth port for supplying as control pressure the control pressure supplied to the fourth port; a valve spool of the second pressure control valve slidably provided in the valve body of the second pressure control valve includes a first land on which the hydraulic pressure supplied through the first port acts, the first land having a relatively small diameter; a second land on which the hydraulic pressure supplied through the first port acts to selectively open and close the second port; and a third land which, together with the second land, selectively communicates the second port and the third port; and an elastic member is disposed between the third land and the valve body.

According to still yet another feature of the present invention, a valve body of the third pressure control valve includes a first port for receiving hydraulic pressure reduced by a reducing valve; a second port for receiving hydraulic pressure from the manual valve; a third port for supplying the hydraulic pressure supplied to the second port to the first and second fail-safe valves; and a fourth port for receiving control pressure from the third solenoid valve; a valve spool of the third pressure control valve slidably provided in the valve body of the third pressure control valve includes a first land on which the hydraulic pressure supplied through the first port acts, the first land having a relatively small diameter; a second land on which the hydraulic pressure supplied through the first port acts to selectively open and close the second port; and a third land which, together with the second land, selectively communicates the second port and the third port; and an elastic member is disposed between the third land and the valve body.

According to still yet another feature of the present invention, a valve body of the low control valve includes a first port receiving low L range pressure; a second port for supplying to the first fail-safe valve the hydraulic pressure supplied to the first port; a third port for receiving from the first fail-safe valve the hydraulic pressure supplied to the second clutch; and a fourth port for receiving as control pressure a part of the hydraulic pressure supplied to the first brake; a valve spool of the low control valve slidably provided in the valve body of the low control valve includes a first land on which the control pressure supplied to the third port acts to selectively open and close the first port; and a second land for selectively communicating the second port with an exhaust port; and an elastic member is disposed between the second land and the valve body.

According to still yet another feature of the present invention, a valve body of the N-R control valve includes a first port communicated with the second pressure control valve; a second port communicated with a reverse R range pressure line; and a third port for selectively supplying the hydraulic pressure supplied to the second port to the first brake via the first fail-safe valve; a valve spool of the N-R control valve slidably provided in the valve body of the N-R control valve includes a first land on which the hydraulic pressure supplied to the first port acts; and a second land for opening and closing the second and third ports; and an elastic member is disposed between the second land and the valve body.

According to still yet another feature of the present invention, a valve body of the line pressure control switch valve includes a first port for receiving drive D range pressure; a second port for receiving second clutch pressure; and a third port for supplying the hydraulic pressure supplied to the second port as variable line pressure to the pressure regulator valve; and a valve spool of the line pressure control switch valve slidably provided in the valve body of the line pressure control switch valve includes a first land on which the hydraulic pressure supplied to the first port acts; and a second land for selectively communicating the second and third ports.

According to still yet another feature of the present invention, a surface area of the second land on which hydraulic pressure acts is larger than a surface area of the first land on which hydraulic pressure acts.

According to still yet another feature of the present invention, a valve body of the first fail-safe valve includes a first port for receiving control pressure from the low control valve; a second port for receiving hydraulic pressure from the third pressure control valve; a third port for receiving hydraulic pressure from the N-R control valve; a fourth port for selectively supplying the hydraulic pressure supplied to the second port to the second clutch; fifth and sixth ports for supplying the hydraulic pressure supplied to the third port to the first brake and the low control valve; and a seventh port for receiving control pressure from the second pressure control valve; a valve spool of the first fail-safe valve slidably provided in the valve body of the first fail-safe valve includes a first land on which the control pressure received through the first port acts; a second land selectively communicating the second port and the fourth port, and, together with the first land, communicating the third port with the fifth and sixth ports; and a third land on which the control pressure received through the seventh port acts; and an elastic member is disposed between the third land and the valve body.

According to still yet another feature of the present invention, a valve body of the second fail-safe valve includes first, second, third and fourth ports connected respectively to a reverse R range pressure line, the fourth clutch, the third pressure control valve and a drive D range pressure line; a fifth port for receiving hydraulic pressure from the second pressure control valve; and a sixth port for supplying the hydraulic pressure supplied to the fifth port to the second brake; a valve spool of the second fail-safe valve slidably provided in the valve body of the second fail-safe valve includes first, second and third lands on which the hydraulic pressure supplied respectively through the first, second and third ports acts; a fourth land selectively communicating the sixth port with an exhaust port and the fifth port; a fifth land selectively communicating the fifth port with the sixth port; and a sixth land on which control pressure received through the fourth port acts, the sixth land being surrounded by a sleeve of the valve body.

According to still yet another feature of the present invention, a valve body of the engine brake control switch valve includes a first port for receiving control pressure from the second pressure control valve; a second port connected to a low D2 range pressure line, the low D2 range pressure line being connected to the manual valve; and a third port for supplying the hydraulic pressure supplied to the second port to the fourth clutch; a valve spool of the engine brake control switch valve slidably provided in the valve body of the engine brake control switch valve includes a first land on which the hydraulic pressure supplied through the first port acts; and a second land selectively communicating the second port and the third port; and an elastic member is disposed between the second land and the valve body.

According to still yet another feature of the present invention, the fourth clutch receives D-range pressure either via the engine brake control switch valve or directly from a low D2 range pressure line.

According to still yet another feature of the present invention, the engine brake control switch valve and the low D2 range pressure line are connected to the fourth clutch with a 3-way valve interposed therebetween.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is a chart illustrating engaged and disengaged states of friction elements of the powertrain of FIG. 1 according to various speeds and shift modes;

DETAILED DESCRIPTION OF THE PREFERRED EMBODIMENTS

Preferred embodiments of the present invention will now be described in detail with reference to the accompanying drawings.

Figure 1:
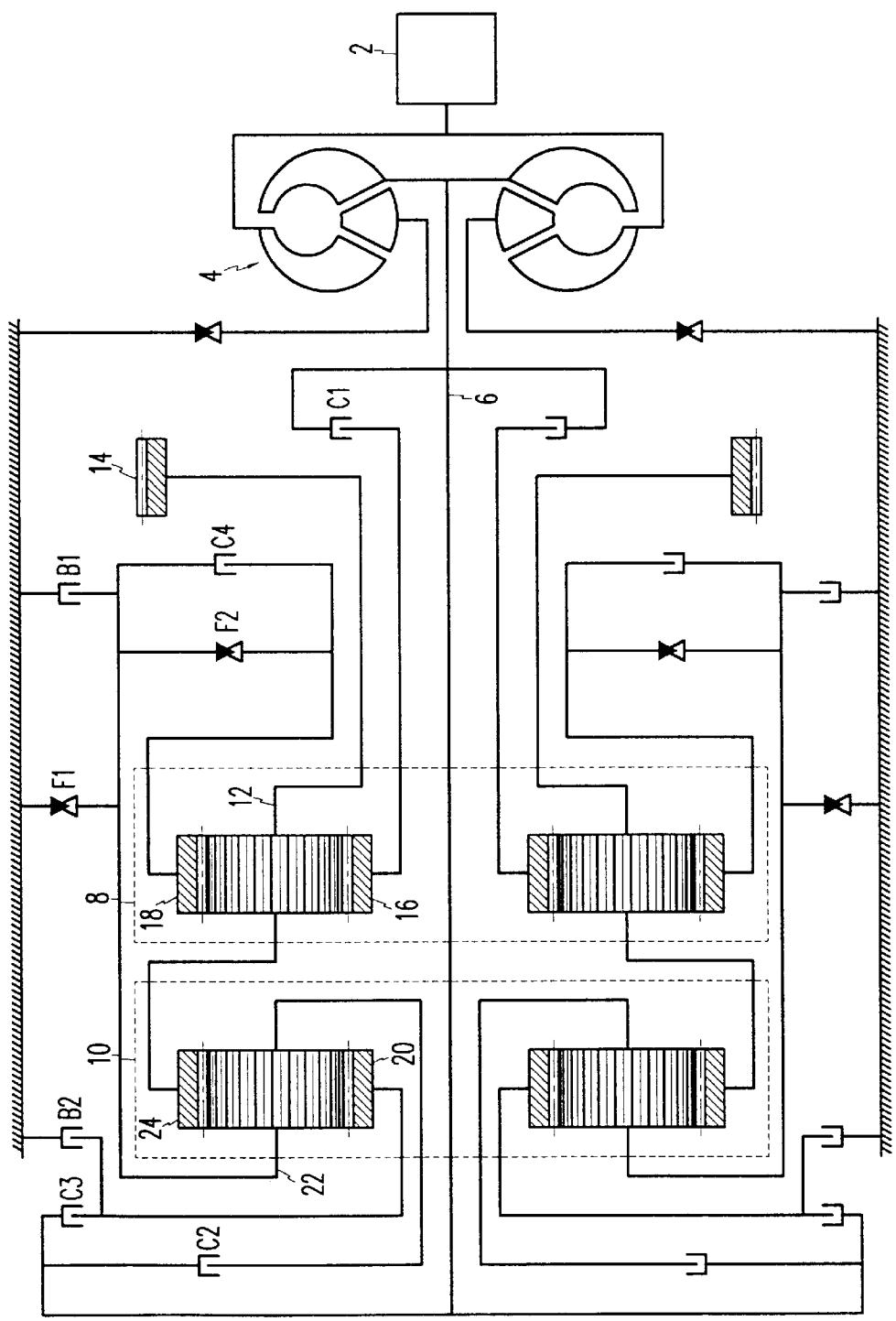
FIG. 1 is a schematic view of a powertrain to which the present invention is applied.

FIG. 1 shows a schematic view of a powertrain to which the present invention is applied.

The powertrain utilizes two single pinion planetary gearsets to obtain first, second, third and fourth forward speeds and a reverse speed. In more detail, torque from an engine 2 is transmitted to an input shaft 6 through a torque converter 4, and the input shaft 6 transmits the engine torque to first and second single pinion planetary gearsets 8 and 10. Shifting into the different ranges and speeds is realized by the operation of the first and second pinion planetary gearsets 8 and 10, after which output is realized via a transfer drive gear 14.

The first single pinion planetary gearset 8 includes a first sun gear 16, a first planet carrier 12 and a first ring gear 18. The second single pinion planetary gearset includes a second sun gear 20, a second planet carrier 22 and a second ring gear 24. Output through the transfer drive gear 14 is realized by the connection of the transfer drive gear 14 to the first planet carrier 12 of the first single pinion planetary gearset 8.

In a state where the first planet carrier 12 is fixedly connected to the second ring gear 24, the first sun gear 16 is connected to the input shaft 6 with a first clutch C1 interposed therebetween, the first clutch C1 being engaged in all forward speeds. The second planet carrier 22 is connected to the input shaft 6 with a second clutch C2 interposed therebetween, the second clutch C2 being engaged in the forward third and fourth speeds. Also, the second sun gear 20 is connected to the input shaft 6 with a third clutch C3 interposed therebetween, the third clutch C3 being engaged in a reverse R range.

Further, the second planet carrier 22 is connected to a transmission housing 26 with a first brake B1 and a first one-way clutch F1 interposed therebetween, the first brake B1 and the first one-way clutch F1 being mounted in parallel. The second planet carrier 22 is also connected to the first ring gear 18 with a fourth clutch C4 and a second one-way clutch F2 interposed therebetween, the fourth clutch C4 and the second one-way clutch F2 being mounted in parallel. In addition, the second sun gear 20 is connected to the transmission housing 26 with a second brake B2 interposed therebetween.

The friction elements of the powertrain described above are engaged and disengaged to effect shifting as shown in FIG. 2.

That is, to realize shifting into the forward first speed, the first clutch C1 and the first and second one-way clutches F1 and F2 are engaged such that the first sun gear 16 operates as an input element, and the first ring gear 18 and the second planet carrier 22 operate as reaction elements. To realize shifting into the forward second speed from the forward first speed, the second brake B2 is additionally engaged such that the first sun gear 18 acts as an input element and the second sun gear 20 acts as a reaction element.

Further, to effect shifting into the forward third speed from the forward second speed, the second clutch is engaged and the second brake B2 is disengaged such that the first and second pinion planetary gearsets 8 and 10 are directly connected, thereby realizing output that is of the same rotational speed as input. From the third speed, shifting into the forward fourth speed is realized by engaging the second brake B2 such that the second sun gear 20 acts as a reaction element. This results in an overdrive state.

To realize shifting into the reverse R range, the third clutch C3 and the first brake B1 are engaged such that the second sun gear 20 acts as an input element and the second planet carrier 22 acts as a reaction element, resulting in shifting into the reverse R range.

Figure 3:
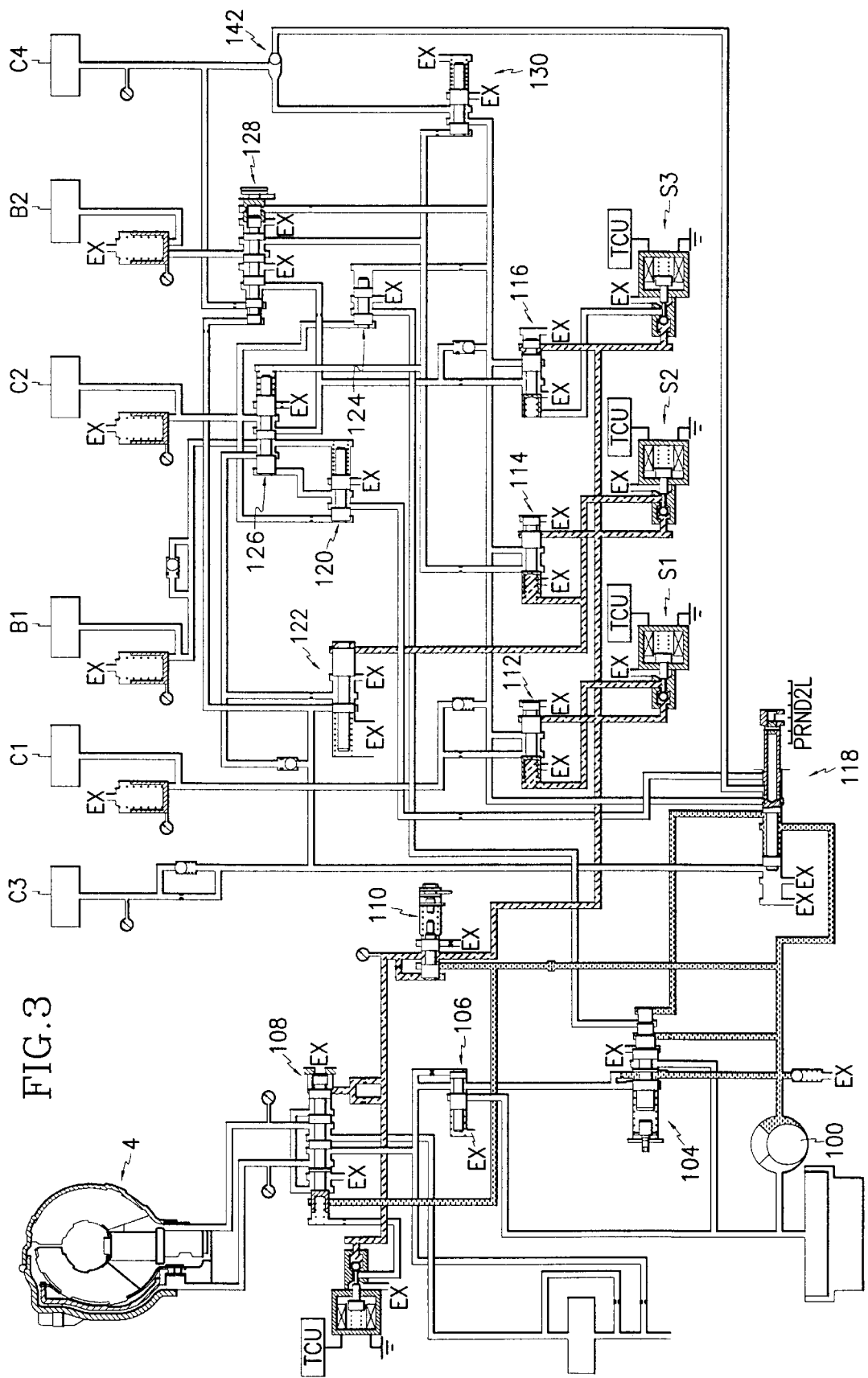
FIG. 3 is a hydraulic circuit diagram in a neutral N range of a hydraulic control system according to a preferred embodiment of the present invention.

FIG. 3 is a hydraulic circuit diagram in a neutral N range of the hydraulic control system according to the present invention. Like reference numerals are used for the elements described above.

The hydraulic control system includes the torque converter 4 which acts as a fluid link between the engine 2 and a transmission, and an oil pump 100 which generates hydraulic flow such that hydraulic pressure is created in the hydraulic control system. The created hydraulic pressure is supplied to pressure/damper clutch control means, pressure reducing means, and shift control means.

The pressure/damper clutch control means includes a pressure control valve 104 for controlling to a predetermined level the hydraulic pressure created by the operation of the oil pump 100; a torque converter control valve 106 for supplying the hydraulic pressure received from the pressure control valve 104 to the torque converter 4 and to locations to be used for lubrication; and a damper clutch control valve 108 for controlling a damper clutch such that the power transmission efficiency of the torque converter 4 is increased.

The pressure reducing means includes a reducing valve 110 for reducing hydraulic pressure passing therethrough to a level lower than line pressure. A part of the hydraulic pressure reduced by the reducing valve 110 is supplied as control pressure of the damper clutch control valve 108. A part of the hydraulic pressure reduced by the reducing valve is also supplied to hydraulic pressure control means, the hydraulic pressure control means including first, second and third pressure control valves 112, 114 and 116 for forming hydraulic pressure for use as shift range control pressure, and including first, second and third solenoid valves S1, S2 and S3 for controlling the first, second and third pressure control valves 112, 114 and 116, respectively.

The shift control means includes a manual valve 118 which is indexed with a driver-controlled select lever to undergo port conversion. According to the shift range selected by the driver, hydraulic pressure supplied to the manual valve 118 is (a) controlled by the hydraulic pressure control means; (b) supplied directly to a low control valve 120 and an N-R control valve 122, a line pressure control switch valve 124 for controlling line pressure, first and second fail-safe valves 126 and 128, and a brake control switch valve 130, the low control valve 120, the N-R control valve 122, the line pressure control switch valve 124, the first and second fail-safe valves 126 and 128, and the brake control switch valve 130 comprising hydraulic pressure distribution means; or (c) supplied directly to the friction elements.

Figure 4:
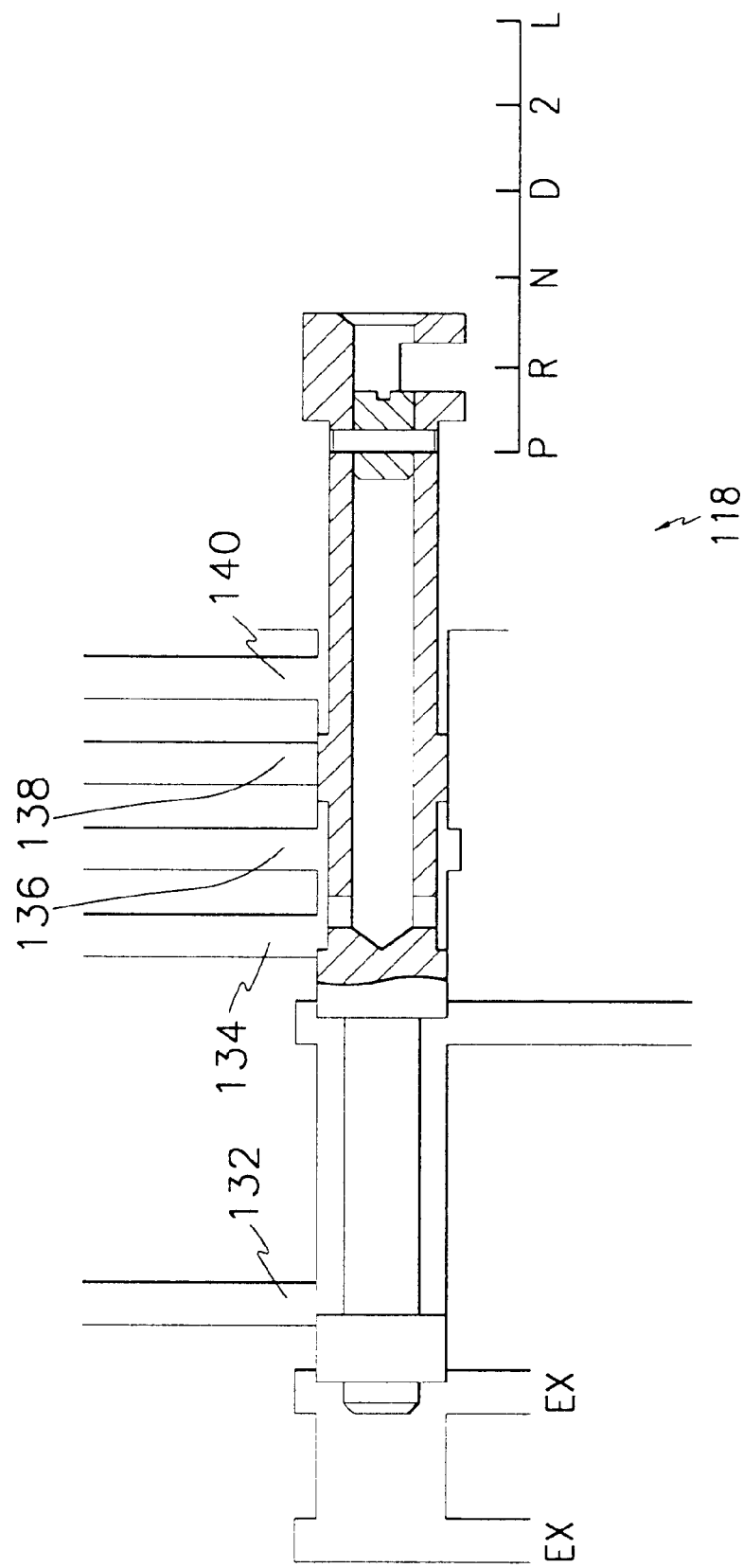
FIG. 4 is a schematic sectional view of a manual valve of the hydraulic control system of FIG. 3.

The manual valve 118, as shown in FIG. 4, is connected to a reverse R range pressure line 132, a forward pressure line 134, a drive D range pressure line 136, a low D2 range pressure line 138, and a low L range pressure line 140. Hydraulic pressure supplied from the oil pump 100 is selectively supplied to these lines according to the shift range selected by the driver. The reverse R range pressure line 132 is directly communicated with the third clutch C3, which is engaged in the reverse R range; the forward pressure line 134 is connected to a pressure regulator valve 102; the drive D range pressure line 136 is connected to the first, second and third pressure control valves 112, 114 and 116, the line pressure control switch valve 124, the second fail-safe valve 128, and the brake control switch valve 130; the low D2 range pressure line 138 is connected to the fourth clutch C4 with a 3-way valve 142 interposed therebetween; and the low L range pressure line 140 is connected to the low control valve 120.

Figure 5:
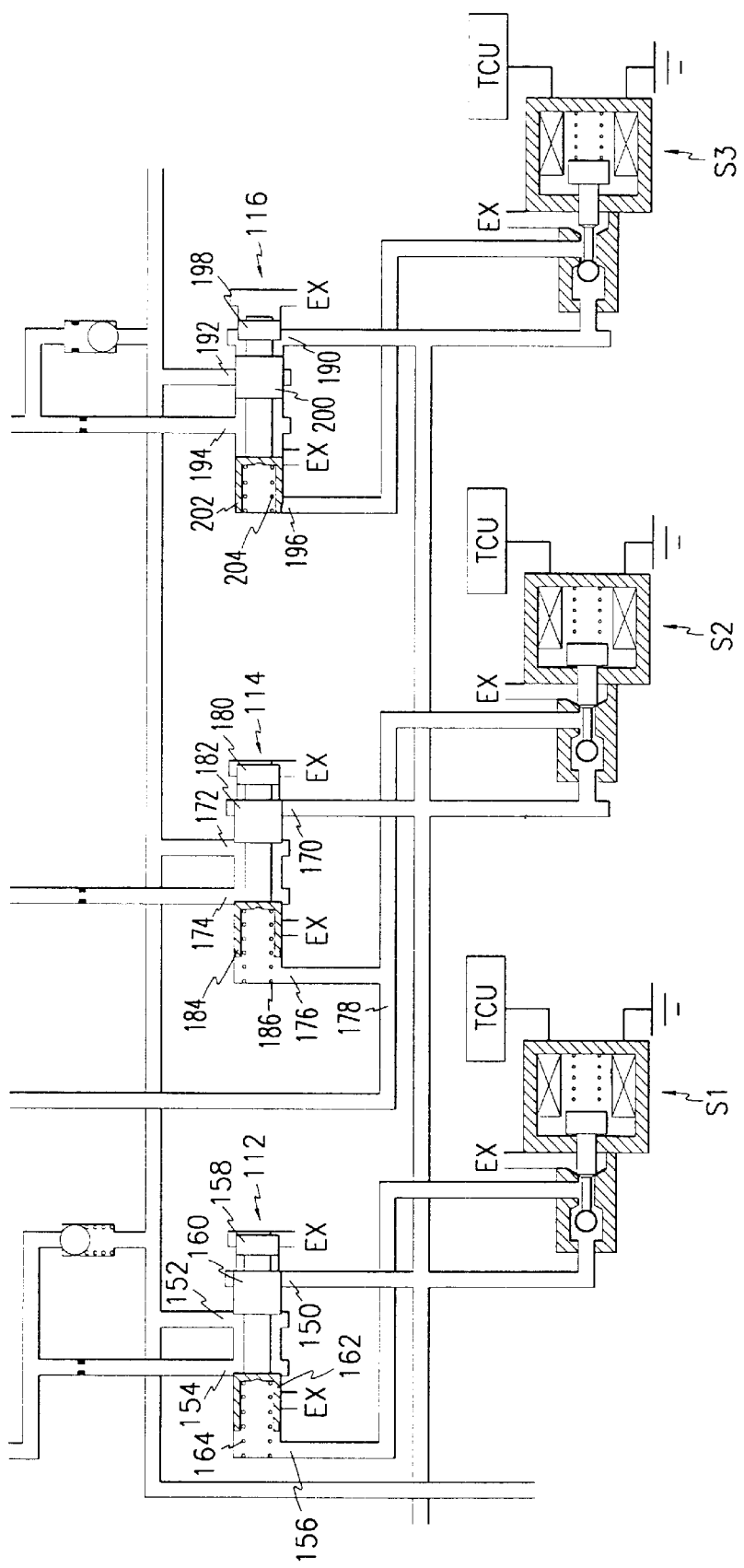
FIG. 5 is a schematic sectional view of elements used to control hydraulic pressure in the hydraulic control system of FIG. 3.

As shown in FIG. 5, a valve body of the first pressure control valve 112 of the hydraulic pressure control means includes a first port 150 for receiving the hydraulic pressure reduced by the reducing valve 110; a second port 152 for receiving hydraulic pressure from the manual valve 118; a third port 154 for supplying the hydraulic pressure received by the second port 152 to the first clutch C1; and a fourth port 156 for receiving control pressure from the first solenoid valve S1.

A valve spool is slidably provided in the valve body of the first pressure control valve 112. The valve spool includes a first land 158 on which the hydraulic pressure supplied through the first port 150 acts, the first land 158 having a relatively small diameter; a second land 160 on which the hydraulic pressure supplied through the first port 150 acts to selectively open and close the second port 152; and a third land 162 which, together with the second land 160, selectively communicates the second port 152 and the third port 154. Further, an elastic member 164 is disposed between the third land 162 and the valve body, the elastic member 164 providing a biasing force to the valve spool in a leftward direction (in the drawing).

As shown in FIGS. 3 and 5, the first solenoid valve S1, which controls the first pressure control valve 112, is a 3-way valve. When the first solenoid valve S1 is controlled to on, the hydraulic pressure supplied as control pressure to the first pressure control valve 112 is exhausted in a state where the supply of reduced pressure to the first pressure control valve 112 is blocked. On the other hand, when the first solenoid valve Si is controlled to off, an exhaust port of the first solenoid valve Si is closed and a passage to enable to supply of reduced pressure to the first pressure control valve 112 is formed. A more detailed description of the first solenoid valve S1 will not be provided herein as the structure and operation of the first solenoid valve S1 are well known in the art.

Accordingly, when the first solenoid valve S1 is controlled to on, the valve spool of the first pressure control valve 112 is displaced to the right (in the drawing) such that the second port 152 is closed. However, if the first solenoid valve S1 is controlled to off, control pressure is supplied to the first pressure control valve 112 such that the valve spool of the same is displaced to the left (in the drawing), thereby resulting in the communication of the second port 152 and the third port 154. This results in hydraulic pressure being supplied to the first clutch C1.

Again with reference to FIG. 5, a valve body of the second pressure control valve 114 of the hydraulic pressure control means includes a first port 170 for receiving hydraulic pressure reduced by the reducing valve 110; a second port 172 for receiving hydraulic pressure from the manual valve 118; a third port 174 for supplying the hydraulic pressure supplied to the second port 172 to the first fail-safe valve 126 and the brake control switch valve 130; a fourth port 176 for receiving control pressure from the second solenoid valve S2; and a fifth port 178 for supplying as control pressure the control pressure supplied to the fourth port 176.

A valve spool is slidably provided in the valve body of the second pressure control valve 114. The valve spool includes a first land 180 on which the hydraulic pressure supplied through the first port 170 acts, the first land 180 having a relatively small diameter; a second land 182 on which the hydraulic pressure supplied through the first port 170 acts to selectively open and close the second port 172; and a third land 184 which, together with the second land 182, selectively communicates the second port 172 and the third port 174. Further, an elastic member 186 is disposed between the third land 184 and the valve body, the elastic member 164 providing a biasing force to the valve spool in a leftward direction (in the drawing).

With the above structure, when the second solenoid valve S2 is controlled to on, the valve spool of the second pressure control valve 114 is displaced to the right (in the drawing) such that the second port 172 is closed. However, if the second solenoid valve S2 is controlled to off, control pressure is supplied to the second pressure control valve 114 such that the valve spool of the same is displaced to the left (in the drawing), thereby resulting in the communication of the second port 172 and the third port 174.

A valve body of the third pressure control valve 116, as shown in FIG. 5, includes a first port 190 for receiving hydraulic pressure reduced by the reducing valve 110; a second port 192 for receiving hydraulic pressure from the manual valve 118; a third port 194 for supplying the hydraulic pressure supplied to the second port 192 to the first and second fail-safe valves 126 and 128; and a fourth port 196 for receiving control pressure from the third solenoid valve S3.

A valve spool is slidably provided in the valve body of the third pressure control valve 116. The valve spool includes a first land 198 on which the hydraulic pressure supplied through the first port 190 acts, the first land 198 having a relatively small diameter; a second land 200 on which the hydraulic pressure supplied through the first port 190 acts to selectively open and close the second port 192; and a third land 202 which, together with the second land 200, selectively communicates the second port 192 and the third port 194. Further, an elastic member 204 is disposed between the third land 202 and the valve body, the elastic member 204 providing a biasing force to the valve spool in a leftward direction (in the drawing).

With the above structure, when the second solenoid valve S3 is controlled to on, the valve spool of the third pressure control valve 116 is displaced to the right (in the drawing) such that the second port 192 is closed. However, if the third solenoid valve S3 is controlled to off, control pressure is supplied to the third pressure control valve 116 such that the valve spool of the same is displaced to the left (in the drawing), thereby resulting in the communication of the second port 192 and the third port 194.

The low control valve 120 is either controlled by hydraulic pressure supplied to the second clutch C2 in third and fourth speeds or by a part of the hydraulic pressure supplied to the first brake B1 in the reverse R range, and acts to supply the hydraulic pressure supplied from the manual valve 118 as control pressure to the first fail-safe valve 126 in the low L range.

Figure 6:
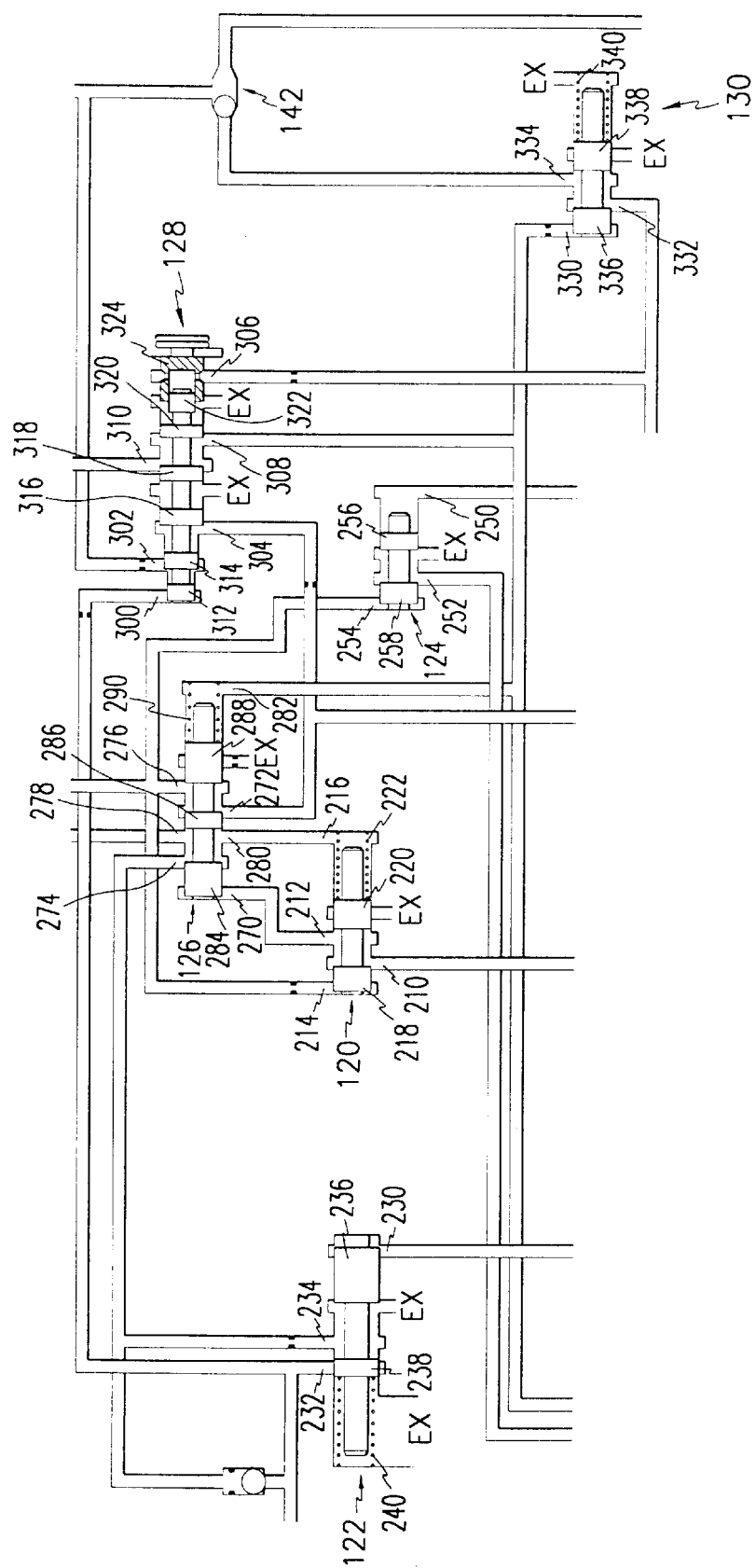
FIG. 6 is a schematic sectional view of elements used to control the distribution of hydraulic pressure in the hydraulic control system of FIG. 3.

A valve body of the low control valve 120, as shown in FIG. 6, includes a first port 210 receiving low L range pressure; a second port 212 for supplying to the first fail-safe valve 126 the hydraulic pressure supplied to the first port 210; a third port for receiving from the first fail-safe valve 126 the hydraulic pressure supplied to the second clutch C2; and a fourth port 216 for receiving as control pressure a part of the hydraulic pressure supplied to the first brake B1.

A valve spool is slidably provided in the valve body of the low control valve 120. The valve spool includes a first land 218 on which the control pressure supplied to the third port 214 acts to selectively open and close the first port 210; and a second land 220 for selectively communicating the second port 212 with an exhaust port. Further, an elastic member 222 is disposed between the second land 220 and the valve body, the elastic member 222, together with the control pressure supplied through the fourth port 216, providing a biasing force to the valve spool in a leftward direction (in the drawing).

The N-R control valve 122 is controlled in the reverse R range by the control pressure supplied to the second pressure control valve 114 and acts to supply the hydraulic pressure supplied to the manual valve 118 to the first brake B1. A valve body of the N-R control valve 122, with reference to FIG. 6, includes a first port 230 communicated with the second pressure control valve 114; a second port 232 communicated with the reverse R range pressure line 132; and a third port 234 for selectively supplying the hydraulic pressure supplied to the second port 232 to the first brake B1 via the first fail-safe valve 126.

A valve spool is slidably provided in the valve body of the N-R control valve 122. The valve spool includes a first land 236 on which the hydraulic pressure supplied to the first port 230 acts; and a second land 238 for opening and closing the second and third ports 232 and 234. Further, an elastic member 240 is disposed between the second land 238 and the valve body, the elastic member 240 providing a biasing force to the valve spool in a rightward direction (in the drawing).

A valve body of the line pressure control switch valve 124, with reference to FIG. 6, includes a first port 250 for receiving drive D range pressure; a second port 252 for receiving second clutch pressure; and a third port 254 for supplying the hydraulic pressure supplied to the second port 252 as variable line pressure to the pressure regulator valve 104. A valve spool is slidably provided in the valve body of the line pressure control switch valve 124. The valve spool includes a first land 256 on which the hydraulic pressure supplied to the first port 250 acts; and a second land 258 for selectively communicating the second and third ports 252 and 254.

Accordingly, variations in line pressure are realized in the third and fourth speeds of the drive D range. At this time, although identical levels of hydraulic pressure enter through the first and second ports 250 and 252, since a surface area of the second land 258 on which hydraulic pressure acts is greater than a surface area of the first land 256 on which hydraulic pressure acts, the valve spool is displaced to the left (in the drawing) such that the second and third ports 252 and 254 are communicated. As a result, line pressure is able to be controlled.

The first fail-safe valve 126 is controlled by control pressure supplied from the low control valve 120 and by control pressure supplied from the second pressure control valve 114. In the third and fourth speeds of the drive D range, the first fail-safe valve 126 undergoes port conversion to supply the hydraulic pressure supplied from the third pressure control valve 116 to the second clutch C2, and in the low L range, the first fail-safe valve 126 undergoes port conversion to supply the hydraulic pressure supplied from the third pressure control valve 116 to the first brake B1.

A valve body of the first fail-safe valve 126, with reference to FIG. 6, includes a first port 270 for receiving control pressure from the low control valve 120; a second port 272 for receiving hydraulic pressure from the third pressure control valve 116; a third port 274 for receiving hydraulic pressure from the N-R control valve 122; a fourth port 276 for selectively supplying the hydraulic pressure supplied to the second port 272 to the second clutch C2; fifth and sixth ports 278 and 280 for supplying the hydraulic pressure supplied to the third port 274 to the first brake B1 and the low control valve 120; and a seventh port 282 for receiving control pressure from the second pressure control valve 114.

A valve spool is slidably provided in the valve body of the first fail-safe valve 126. The valve spool includes a first land 284 on which the control pressure received through the first port 270 acts; a second land 286 selectively communicating the second port 272 and the fourth port 276, and, together with the first land 284, communicating the third port 274 with the fifth and sixth ports 278 and 280; and a third land 288 on which the control pressure received through the seventh port 282 acts. Further, an elastic member 290 is disposed between the third land 288 and the valve body, the elastic member 290 providing a biasing force to the valve spool in a leftward direction (in the drawing).

The second fail-safe valve 128 selectively supplies hydraulic pressure supplied from the second pressure control valve 114 to the second brake B2. A valve body of the second fail-safe valve 128, with reference to FIG. 6, includes first, second, third and fourth ports 300, 302, 304 and 306 connected respectively to the reverse R range pressure line 132, the fourth clutch C4, the third pressure control valve 116 and the drive D range pressure line 136; a fifth port 308 for receiving hydraulic pressure from the second pressure control valve 114; and a sixth port for supplying the hydraulic pressure supplied to the fifth port 308 to the second brake B2.

A valve spool is slidably provided in the valve body of the second fail-safe valve 128. The valve spool includes first, second and third lands 312, 314 and 316 on which the hydraulic pressure supplied respectively through the first, second and third ports 300, 302 and 304 acts; a fourth land 318 selectively communicating the sixth port 310 with an exhaust port and the fifth port 308; a fifth land 320 selectively communicating the fifth port 308 with the sixth port 310; and a sixth land 322 on which control pressure received through the fourth port 306 acts, the sixth land 322 being surrounded by a sleeve 324 of the valve body.

The brake control switch valve 130 supplies hydraulic pressure supplied from the manual valve 118 to the fourth clutch C4 in the first and third speeds of the drive D range and in the low L range. A valve body of the brake control switch valve 130, with reference to FIG. 6, includes a first port 330 for receiving control pressure from the second pressure control valve 114; a second port 332 connected to the low D2 range pressure line 138, the low D2 range pressure line 138 being connected to the manual valve 118; and a third port 334 for supplying the hydraulic pressure supplied to the second port 332 to the fourth clutch C4. Also, the 3-way valve 142 is provided between the low D2 range pressure line 138 and the brake control switch valve 130.

A valve spool is slidably provided in the valve body of the brake control switch valve 130. The valve spool includes a first land 336 on which the hydraulic pressure supplied through the first port 330 acts; and a second land 338 selectively communicating the second port 332 and the third port 334. An elastic member 340 is disposed between the second land 338 and the valve body, the elastic member 340 providing a biasing force to the valve spool in a leftward direction (in the drawing).

In the neutral N range of the hydraulic control system of the present invention structured as in the above, as shown in FIG. 3, the hydraulic pressure generated as a result of the hydraulic flow created by the oil pump 100 is controlled to a predetermined level of hydraulic pressure by the pressure control valve 104. The hydraulic pressure is then reduced by passing through the reducing valve 110 then supplied to each the damper clutch control valve 108, and the first, second and third pressure control valves 112, 114 and 116. At this time, the first and second solenoid valves S1 and S2 are controlled to OFF by the ECU, thereby resulting in the flow of hydraulic pressure as shown in FIG. 3.

Figure 7:
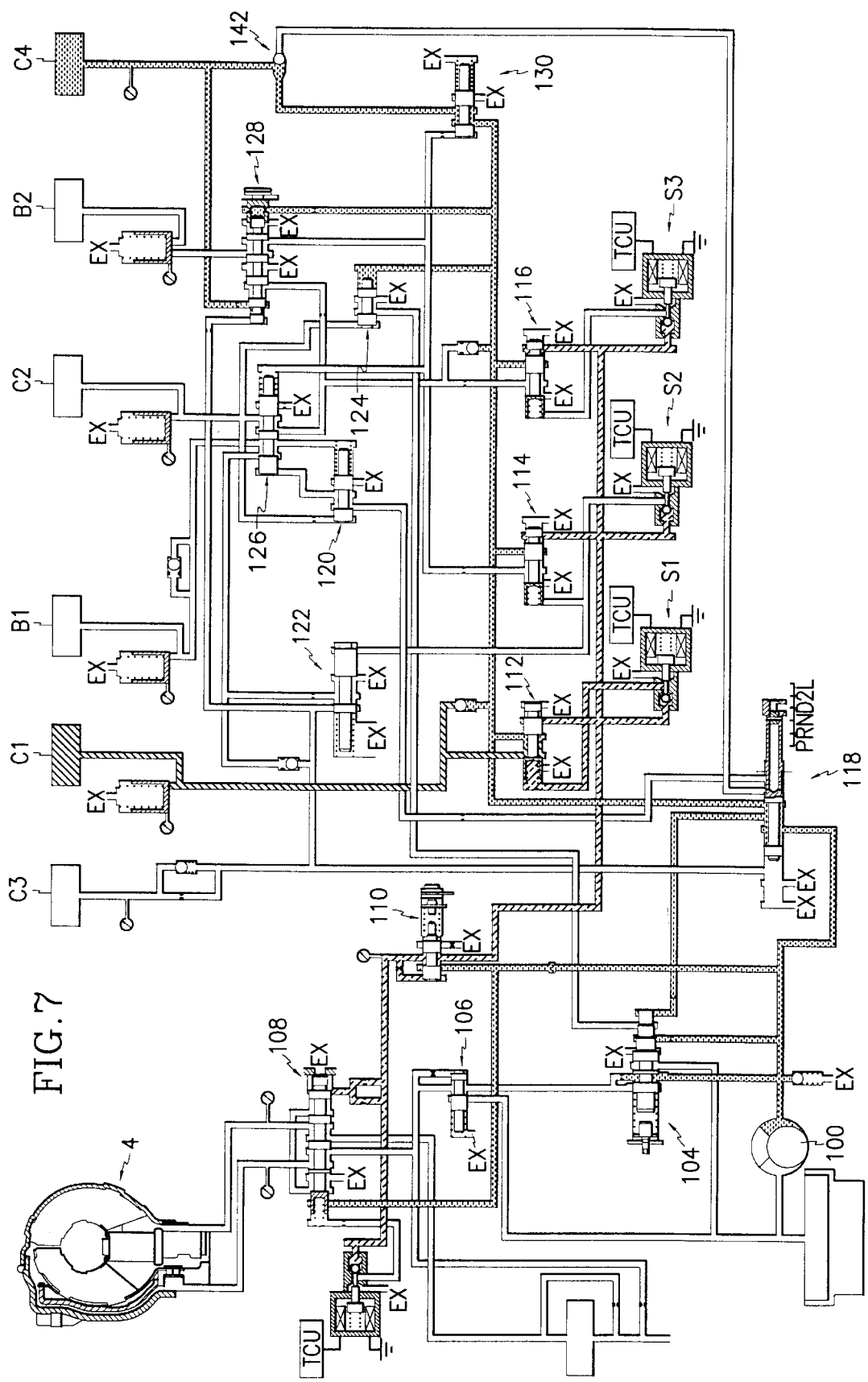
FIG. 7 is a hydraulic circuit diagram in a first speed of a drive D range of the hydraulic control system of FIG. 3.

In the first speed of the drive D range, as shown in FIG. 7, the hydraulic pressure supplied from the manual valve 118 is supplied to the pressure control valve 104 via the forward pressure line 134, and, at the same time, is supplied via the drive D range pressure line 136 to the brake control switch valve 130 and the first, second and third pressure control valves 112, 114 and 116. At this time, since the first solenoid valve S1 is duty controlled, the hydraulic pressure is controlled by the first pressure control valve 112 and supplied to the first clutch C1, and the hydraulic pressure supplied to the brake control switch valve 130 is supplied to the fourth clutch C4 as a result of the leftward displacement of the valve spool of the brake control switch valve 130.

Figure 8:
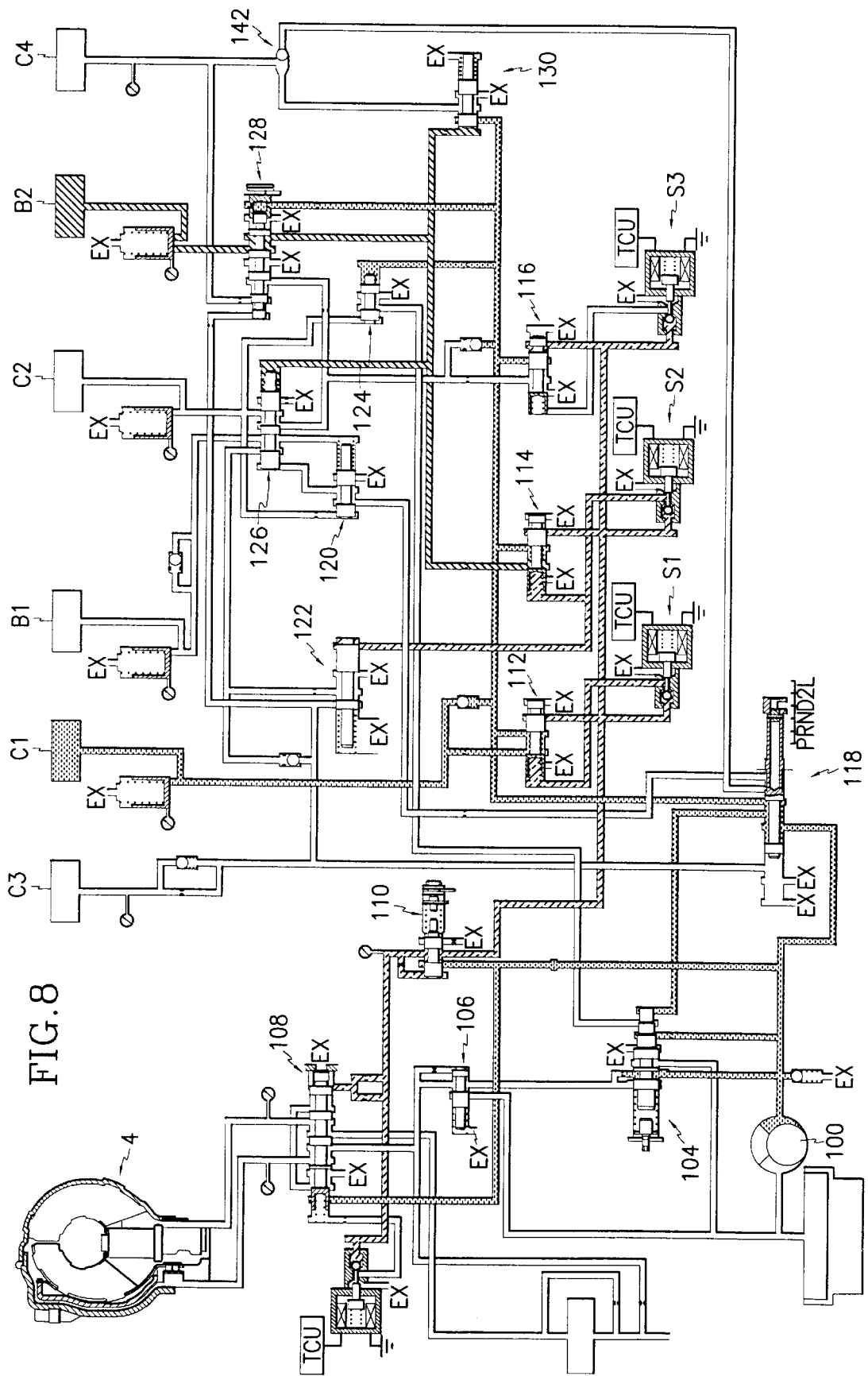
FIG. 8 is a hydraulic circuit diagram in a second speed of the drive D range of the hydraulic control system of FIG. 3.

If vehicle speed and throttle opening are increased in the first speed of the drive D range, shifting into the second speed of the drive D range is performed. That is, as shown in FIG. 8, the second solenoid valve S2, which is controlled to ON by the ECU in the first speed of the drive D range, is duty controlled such that the control pressure of the second pressure control valve 114 is supplied to the first and second fail-safe valves 126 and 128, and to the brake control switch valve 130. At this time, the valve spool of the second fail-safe valve 128 is displaced to the left by the hydraulic pressure supplied from the manual valve 118 such that the pressure of the second pressure control valve 114, supplied to the second fail-safe valve 128, is supplied to the second brake B2. Also, the valve spool of the brake control switch valve 130 is displaced to the right by the pressure of the second pressure control valve 114 such that the supply of hydraulic pressure to the fourth clutch C4 is discontinued, thereby realizing shifting into the second speed of the drive D range.

Figure 9:
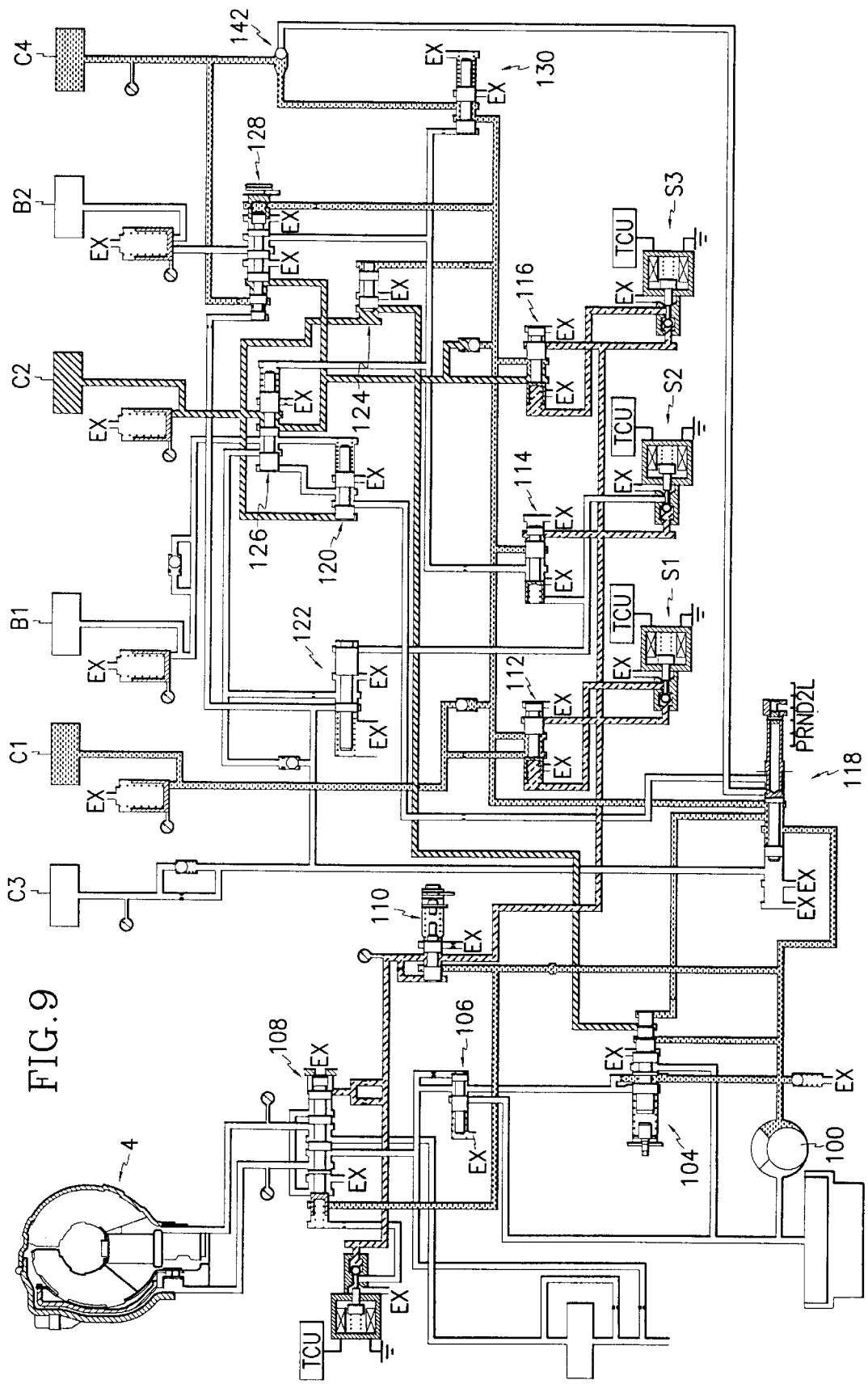
FIG. 9 is a hydraulic circuit diagram in a third speed of the drive D range of the hydraulic control system of FIG. 3.

If vehicle speed and throttle opening are increased in the second speed of the drive D range, shifting into the third speed of the drive D range is performed. That is, as shown in FIG. 9, the second solenoid valve S2 is controlled to ON and the third solenoid valve S3 is controlled to OFF by the ECU. Accordingly, the hydraulic pressure supplied from the second pressure control valve 114 is discontinued such that the second brake B2 is disengaged, and, at the same time, the control pressure supplied to the brake control switch valve 130 is released. This results in the valve spool of the brake control switch valve 130 being displaced to the left such that the hydraulic pressure supplied from the manual valve 118 is supplied to the fourth clutch C4.

Further, the pressure of the third pressure control valve 116 passes through the first fail-safe valve 126 to be supplied to the second clutch C2, thereby realizing shifting into the third speed. At this time, part of the hydraulic pressure supplied to the second clutch C2 passes through the line pressure control switch valve 124 and is supplied to the pressure control valve 104 such that line pressure control is realized.

Figure 10:
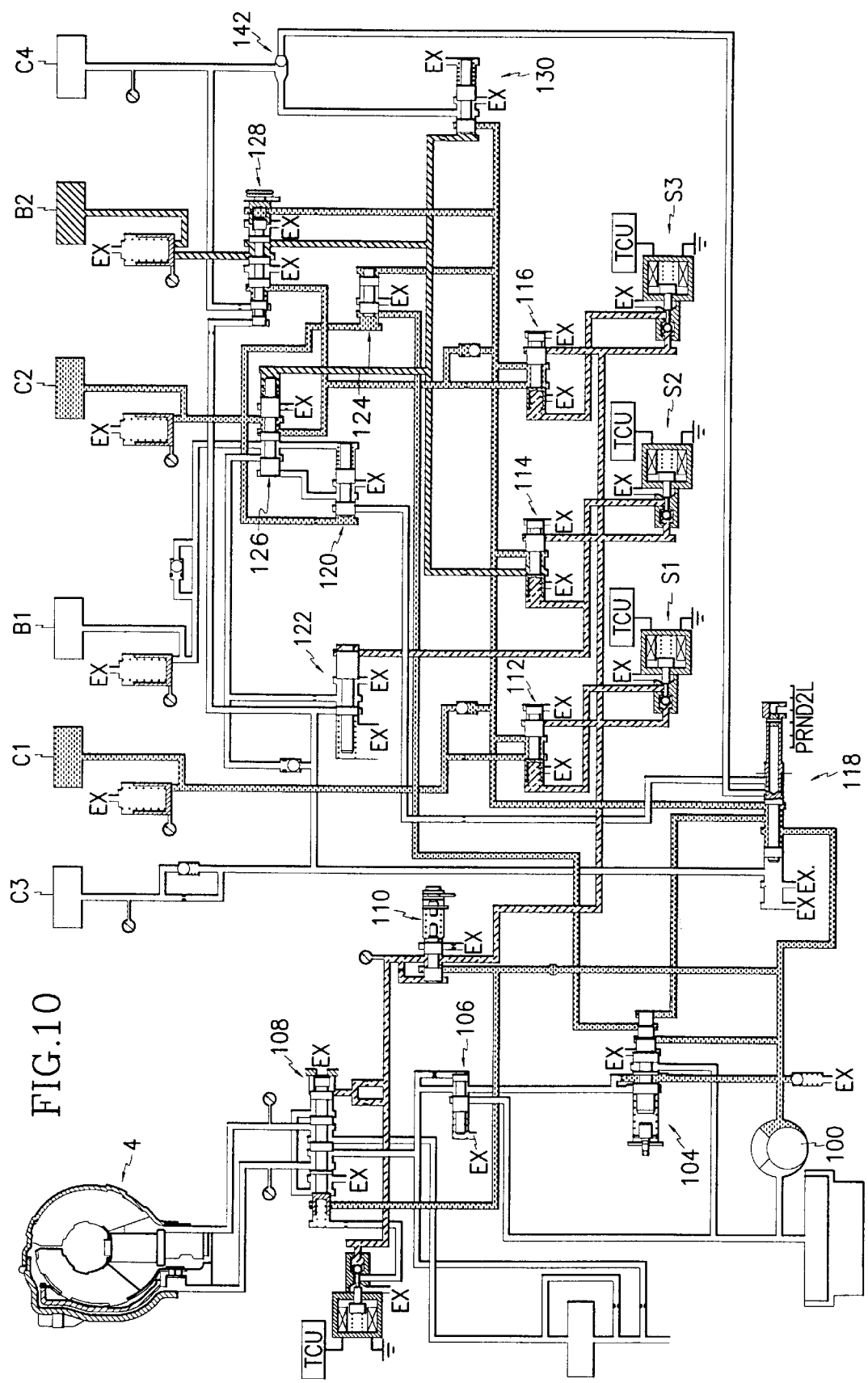
FIG. 10 is a hydraulic circuit diagram in a fourth speed of the drive D range of the hydraulic control system of FIG. 3.

If vehicle speed and throttle opening are increased in the third speed of the drive D range, shifting into the fourth speed of the drive D range is performed. That is, as shown in FIG. 10, the second solenoid valve S2 is controlled to OFF such that hydraulic pressure is supplied to the second brake B2 after passing through the second fail-safe valve 128. Also, part of the pressure of the second pressure control valve 114 is supplied as control pressure to the brake control switch valve 130 such that the hydraulic pressure supplied to the fourth clutch C4 is discontinued, thereby realizing shifting into the fourth speed.

Line pressure control also occurs during the above control, and since the first, second and third solenoid valves S1, S2 and S3 are all controlled to OFF in the fourth speed of the drive D range, if a malfunction occurs in the drive D range, the fourth speed is held by the OFF control of the first, second and third solenoid valves S1, S2 and S3.

Figure 11:
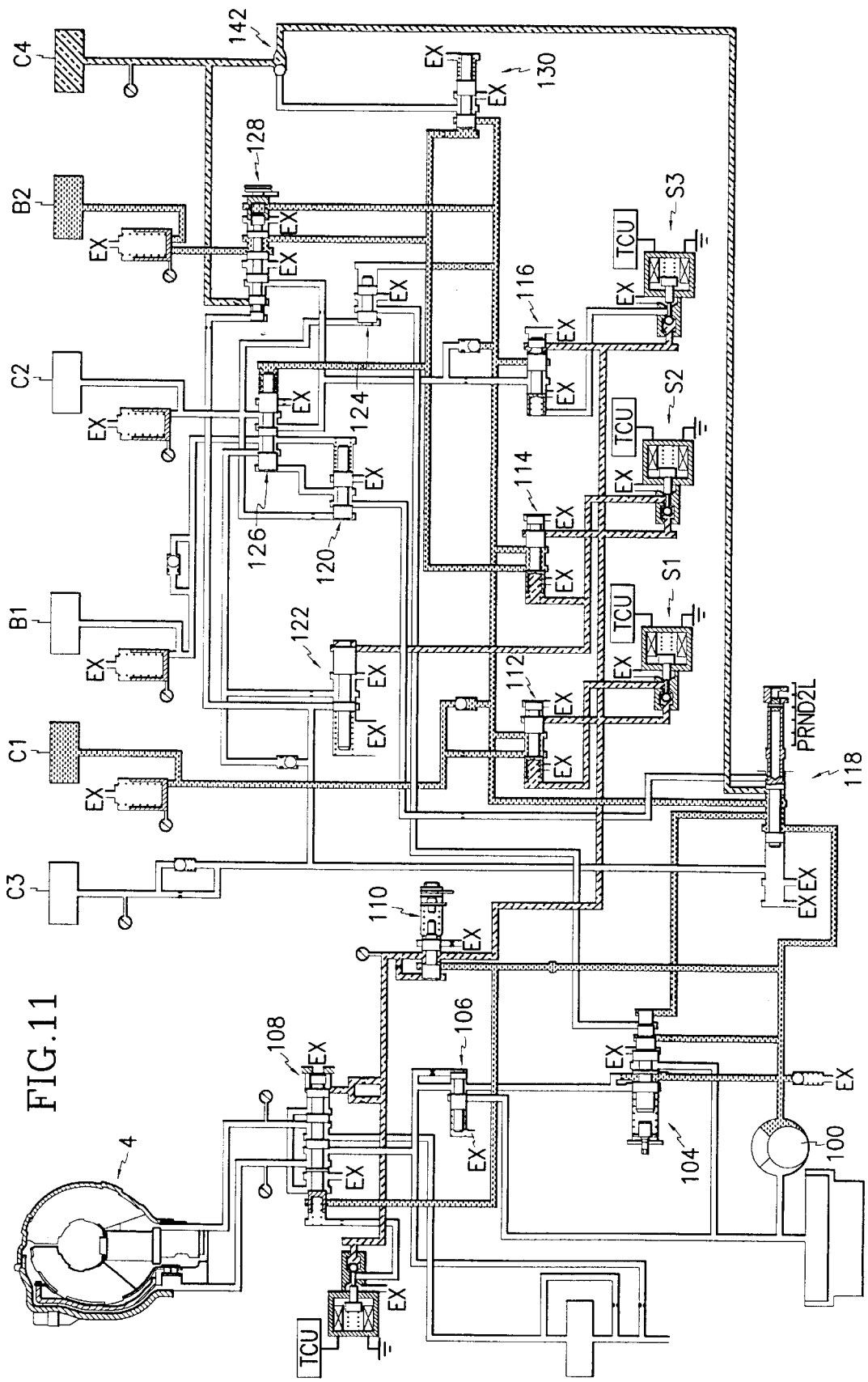
FIG. 11 is a hydraulic circuit diagram in a second speed of a low D2 range of the hydraulic control system of FIG. 3.

In the low D2 range, with reference to FIG. 11, hydraulic flow is realized identically as in the second speed of the drive D range. At this time, hydraulic pressure supplied to the low D2 range pressure line 138 from the manual valve 118 is supplied to the fourth clutch C4 via the 3-way valve 142 while the engine brake is operated. If a malfunction occurs in the transmission while in the low D2 range, the third solenoid valve S3 is controlled to OFF such that hydraulic pressure of the third solenoid valve S3 is supplied to the second clutch C2, and, at the same time, controls the second fail-safe valve 128. As a result, the hydraulic pressure supplied to the second brake B2 is discontinued, thereby holding the third speed of the drive D range.

In the present invention, by holding the third speed in the low D2 range and the fourth speed in the drive D range when a malfunction occurs in the transmission, overall stability and drive performance are improved.

Figure 12:
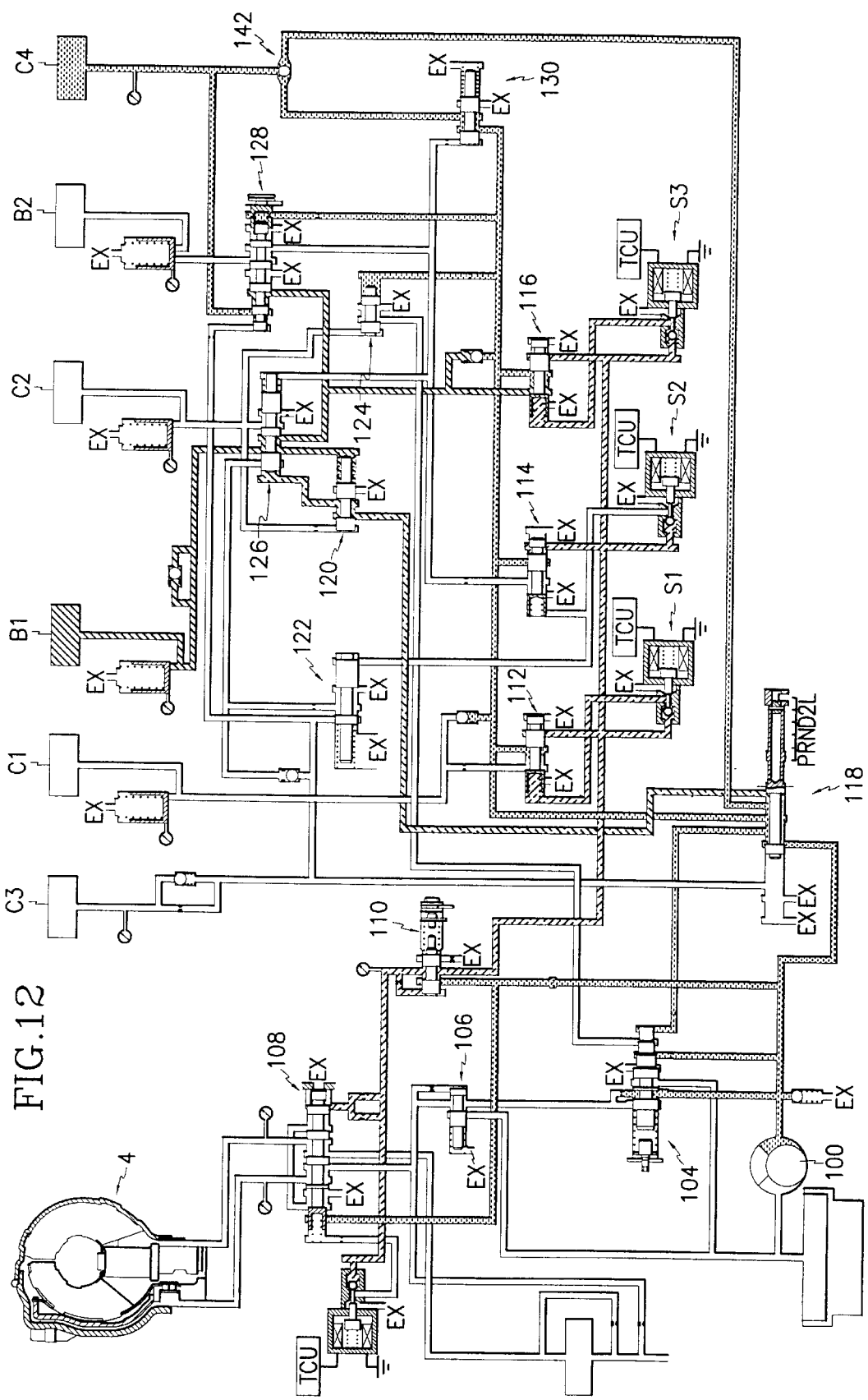
FIG. 12 is a hydraulic circuit diagram in a first speed of a low L range of the hydraulic control system of FIG. 3.

In the first speed of the low L range, as shown in FIG. 12, the first and third solenoid valves S1 and S3 are controlled to OFF such that the hydraulic pressure of the first pressure control valve 112 is supplied to the first clutch C1 and the hydraulic pressure of the third pressure control valve 116 is supplied to the first fail-safe valve 126. At this time, since the hydraulic pressure of the manual valve 118 is supplied to the first fail-safe valve 126 via the low control valve 120, the valve spool of the low control valve 120 is displaced to the right such that the hydraulic pressure of the third pressure control valve 116 is supplied to the first brake B1. Also, line pressure of the manual valve 118 is supplied to the fourth clutch C4 via the brake control switch valve 130.

Figure 13:
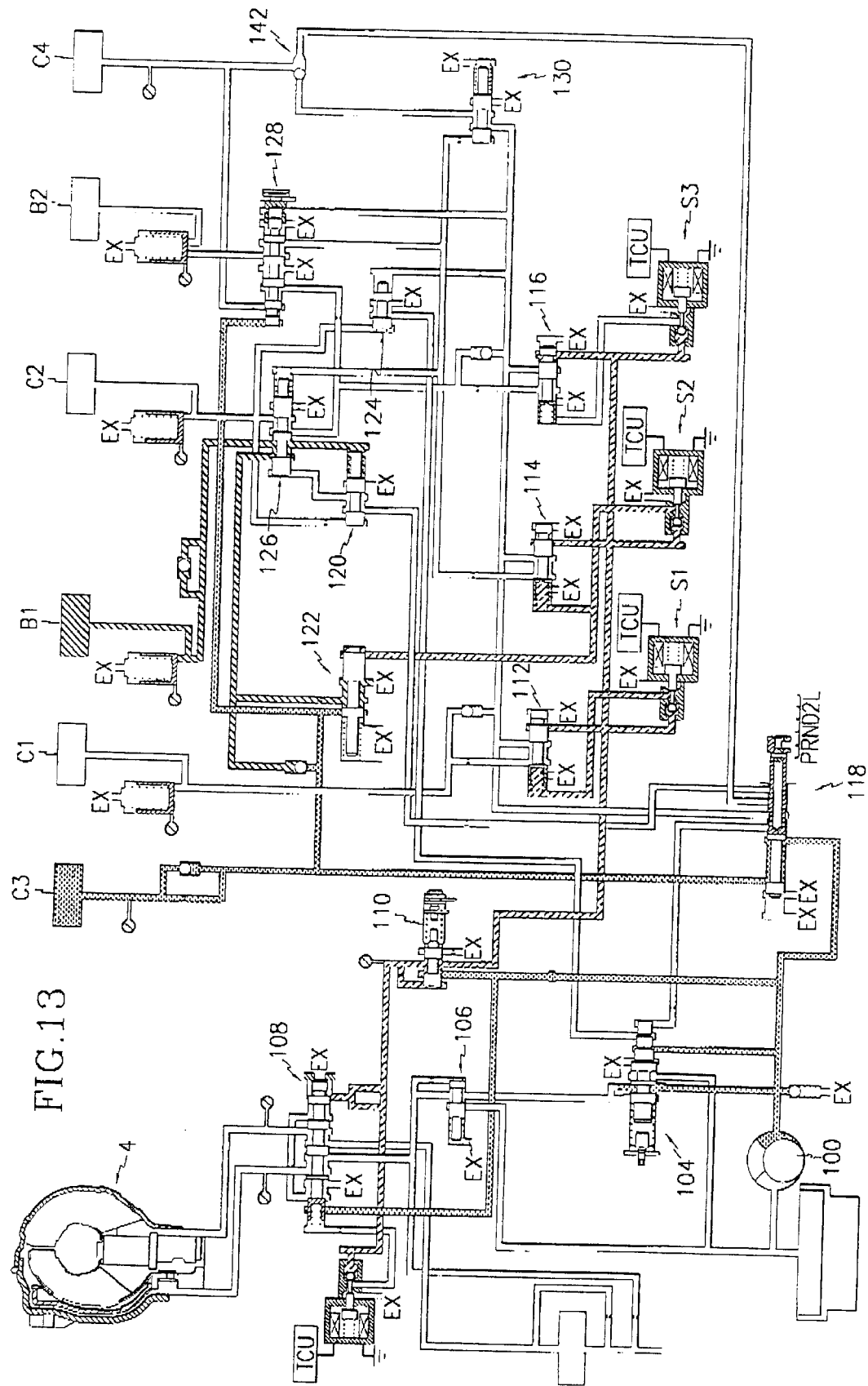
FIG. 13 is a hydraulic circuit diagram in a reverse R range of the hydraulic control system of FIG. 3.

In the reverse R range, as shown in FIG. 13, part of the hydraulic pressure of the reverse R range pressure line 132 of the manual valve 118 is supplied directly to the third clutch C3, and that portion of hydraulic pressure is controlled by the N-R control valve 122 and supplied to the first brake B1 via the first fail-safe valve 126. At this time, the hydraulic pressure supplied to the first brake B1 is controlled while the N-R control valve 124 is controlled by the control pressure of the second solenoid valve S2.

In addition to the above shift operations, downshifting from the fourth to the third speeds, from the third to the second speeds, and from the second to the first speeds, in addition to skip shifting from the fourth to the second speeds is also possible. However, since such shift operations fall within the scope of the present invention presented above, a detailed description will not be provided herein.

In the hydraulic control system of the present invention applied to a powertrain utilizing two single pinion planetary gearsets, four clutches, two one-way clutches, and two brakes to obtain four forward speeds and one reverse speed, an engine brake is operated at only a high stage of each range such that drive performance is improved. Also, a fail-safe mode is provided by the hydraulic control system of the present invention by holding the fourth speed in the drive D range and the third speed in the low D2 range such that drive performance is improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission wherein a hydraulic pressure distributor comprises:

a low control valve for supplying L-range pressure to another valve as control pressure in a low L-range such that control pressure of a third pressure control valve is supplied to a first brake;

an N-R control valve for supplying reverse pressure to the first brake by reduced pressure supplied via a pressure control valve when shifting into the reverse R-range;

a line pressure control switch valve controlled by the D-range pressure and hydraulic pressure supplied to a second clutch, the line pressure control switch valve supplying a part of the hydraulic pressure supplied to the second clutch to a pressure regulator valve;

a first fail-safe valve controlled by the control pressure supplied from the low control valve and from a second pressure control valve, the first fail-safe valve undergoing port conversion to supply hydraulic pressure supplied from a third pressure control valve to the second clutch in the third and fourth speeds of the drive D-range, and the hydraulic pressure supplied from the third pressure control valve to the first brake in the low L-range;

a second fail-safe valve controlled by the reverse pressure, hydraulic pressure supplied to a fourth clutch, and hydraulic pressure supplied to a third clutch, the second fail-safe valve supplying the hydraulic pressure supplied from the second pressure control valve to a second brake in the second and fourth speeds of the drive D-range; and an engine brake control switch valve for supplying the D-range pressure to a fourth clutch in the first and third speeds of the drive D-range.

* * * * *